United States Patent [19]

Wilt et al.

[11] Patent Number: 4,532,272

[45] Date of Patent: Jul. 30, 1985

[54] CREATION AND MAINTENANCE OF THE BED OF A PARTICLE FORM EVAPORATOR

[75] Inventors: Mason S. Wilt, Amarillo, Tex.; Richard E. Dietz, Bartlesville, Okla.

[73] Assignee: Phillips Petroleum Company, Bartlesville, Okla.

[21] Appl. No.: 625,750

[22] Filed: Jun. 28, 1984

[51] Int. Cl.$^3$ ................................ C08K 5/54
[52] U.S. Cl. .................... 523/330; 524/264; 524/265; 524/287; 524/322
[58] Field of Search ............... 523/330; 524/264, 265, 524/287, 322

[56] References Cited

U.S. PATENT DOCUMENTS

| | | | |
|---|---|---|---|
| 3,400,096 | 9/1968 | Bateman et al. | 523/330 |
| 3,413,390 | 11/1968 | Heiss | 264/54 |
| 3,538,213 | 11/1970 | Robert | 264/225 |
| 3,765,911 | 10/1973 | Knowles et al. | 106/2 |
| 4,111,861 | 9/1978 | Godlewaki | 521/123 |
| 4,213,869 | 7/1980 | Kosinsky | 252/37.5 |
| 4,271,213 | 6/1981 | Grimm et al. | 427/222 |
| 4,310,973 | 1/1982 | King | 34/10 |
| 4,370,198 | 1/1983 | Dencs et al. | 159/48.1 |

OTHER PUBLICATIONS

Blue Book 1981, Bill Publications (167–173; 257–270).

Primary Examiner—Joseph L. Schofer
Assistant Examiner—N. Sarofim
Attorney, Agent, or Firm—S. E. Reiter

[57] ABSTRACT

An additive comprising at least one parting agent is added to a particle form evaporator to reduce the buildup of polymer on the walls and rotor of the agitated bed of the particle form evaporator. In an alternate embodiment, the additive employed further comprises at least one filler.

18 Claims, 2 Drawing Figures

CREATION AND MAINTENANCE OF THE BED OF A PARTICLE FORM EVAPORATOR

This invention relates to particle form evaporation. In one aspect this invention relates to the creation and maintenance of a bed of polymer particles in a particle form evaporation process. In another aspect this invention relates to particle form evaporation apparatus.

BACKGROUND

Solvent can be removed from a polymer solution (or, in other words, polymer can be recovered from a solution) by employing a particle form evaporation process. Particle form evaporation is described, for example, in U.S. Pat. Nos. 4,310,973 and 4,263,091, incorporated by reference herein. Broadly, particle form evaporation involves introducing a polymer solution into an agitated bed of polymer particles. Typically, the introduction of polymer solution is accomplished by spraying the polymer solution into the bed; however, there are many variations of the process compatible with our invention.

Some polymers such as, for example, the polybutadienes, are so sticky that there is a strong tendency for polymer to build up on the rotor and walls of the purge column of a particle form evaporator. In addition, many polymers are so fluid that even with agitation the tendency towards formation of particles is so weak that the particle form evaporation process can be impracticable as a method for drying the polymer (i.e. removing solvent from the polymer). Successful removal of substantially all of the solvent from a polymer solution depends upon the ability to minimize the formation of agglomerates, i.e., the buildup of polymer on the purge column walls and rotor of a particle form evaporator, as well as the creation and maintenance of small polymer particles. Our invention makes practicable application of the particle form evaporation process to such polymers and facilitates the processing of polymers already suitable for the particle form evaporation process.

Objects of the Invention

It is an object of our invention to enhance the removal of solvent from a polymer solution.

It is another object of our invention to prevent the buildup of polymer on the walls and rotor of the purge column of a particle form evaporator.

It is yet another object of our invention to create and maintain a bed of small polymer particles into which a polymer solution is introduced in order to recover dried polymer.

These objects and other objects and advantages of our invention will be made apparent from a study of this disclosure and of the appended claims.

SUMMARY OF THE INVENTION

In accordance with our invention, particle form evaporation apparatus and particle form evaporation process are provided. In one embodiment, additive comprising at least one parting agent is introduced into an agitated bed of polymer particles to which a polymer solution comprising polymer and solvent is also introduced.

In another embodiment of our invention, the additive employed comprises at least one parting agent and at least one filler.

In accordance with yet another embodiment of our invention, apparatus is provided comprising a vessel capable of holding a bed of polymer particles with means therein for mechanically agitating the bed of polymer particles, means for introducing polymer solution into the vessel and means for introducing additive into the vessel.

DETAILED DESCRIPTION OF THE INVENTION

Figure 1:
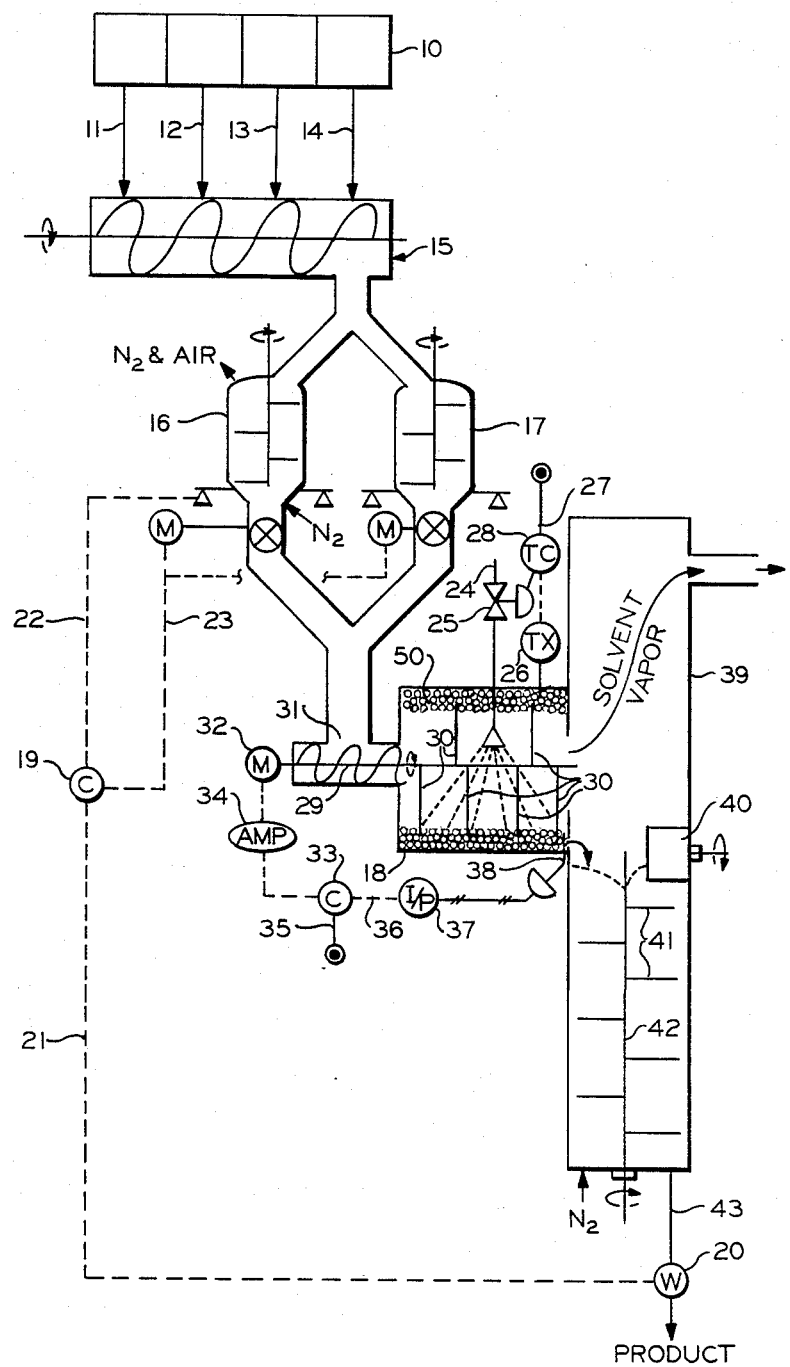
FIG. 1 depicts one embodiment of a particle form evaporation apparatus suitable for practice of the process of the invention.

In accordance with our invention, an additive comprising at least one parting agent is added to the bed of polymer particles in a particle form evaporator before or during the particle form evaporation process. This facilitates prevention of particle agglomeration, i.e., sticking of polymer particles to the surfaces of the particle form evaporator, such as for example the inner walls of the purge column and the rotor.

Most elastomers, plastomers and some plastics are not used as pure polymer but are compounded with a variety of other materials such as, for example, carbon black, clay, silica, pigments or even other polymers (such as, for example, polystyrene). Most of these fillers will harden and reduce the plasticity of the polymer such that it loses much of its fluidity and becomes more friable.

In accordance with an embodiment of our invention an additive further comprising at least one filler, such as for example, at least one of the fillers indicated above, as well as at least one parting agent, is added to the polymer particle bed in a particle form evaporator before or during the particle form evaporation process rather than to the dried polymer at some later time. This enables one to take advantage of the utility of such fillers to promote and improve the creation and maintenance of small polymer particles, as well as to prevent sticking of the polymer particles.

Generally, the polymer solution is comprised of the polymer and, typically, a hydrocarbon solvent such as, for example, cyclohexane or n-hexane. The polymer solution is usually preheated to a temperature sufficiently high to vaporize a substantial portion of the solvent when it is sprayed into the agitated bed of polymer particles, but not so high as to cause thermal degradation of the polymer. In the case of a rubbery polymer solution such as butadiene-styrene copolymer in cyclohexane, the solution can be preheated up to about 400° F. (204° C.) without encountering the adverse effects of thermal degradation of the polymer.

Once the polymer solution has been sufficiently heated, the solution can be flashed by spraying it into an agitated bed of dry polymer particles. The flashing of the solvent yields porous droplets having a higher concentration of solids. Generally, 25–70 percent of the solvent is removed in the spray flash, depending upon the temperature of the solution, the characteristics of the polymer, the viscosity of the polymer solution, and its concentration. The polymer solution can be concentrated by flashing in one or more stages before it is heated and sprayed into the agitated bed of polymer particles. The droplets, which would otherwise coalesce into a viscous mass, are enveloped by hot, relatively dry polymer particles. Agglomerates having a sticky droplet as a core and a coating of dry polymer on the surface are formed.

The bed of polymer particles provides resistance to the mechanical agitation (e.g. rotating mixer blades). As a result of this resistance there is an input of heat into the bed. The mechanical agitation supplies all or a significant portion of the total heat required for the drying process. Rotating blades can be used to provide the agitation of the polymer bed. The term blade is intended to be broadly construed and includes, for example, paddles, rods, pins and the like.

When more energy is required for the drying process it can be supplied by passing a hot inert gas into and through the agitated polymer bed. The energy imparted to the system from the mechanical agitation and the inert gas causes evaporation of substantially all of the remaining solvent from the polymer.

Although other gases could be used, inert gas is used in order to reduce the safety and health hazards associated with other gases such as, for example, hydrocarbon gases, and to minimize oxidation of the hot polymer. Examples of inert gases which can be used include, but are not limited to $N_2$, Ar, $CO_2$ and fuel gas. The temperature of the inert gas is usually fixed at some temperature above the normal boiling point of the solvent, but below the point at which significant thermal degradation of the polymer will occur. In the case of drying a butadiene-styrene rubbery copolymer in solution in cyclohexane, an operating temperature of 190°–275° F. is preferred. Since this temperature is above the boiling point of the solvent cyclohexane, the solvent will be vaporized and carried off, yet the polymer will not stick to the equipment so long as the temperature is either below the softening point of the polymer or the temperature exceeds the softening point only to the extent that the shear forces generated by the agitator are greater than the forces of the polymer causing it to "stick". When the temperature is outside this range or when the agitator is at rest, the polymer becomes "sticky" and forms a lump and/or sticks to the interior surfaces of the particle form evaporator. However, when forces rendering the polymer "sticky" are small compared to the internal shear forces generated by the agitator, the polymer tends to form particles. Normally "sticky" material may remain free flowing in a highly agitated bed, but will block into a lump in a less highly agitated bed or after it is removed and kept in a static state. At extreme conditions, e.g., operating temperatures that greatly exceed 275° F. in the case of drying a butadiene-styrene copolymer or drying of very low molecular weight polymers, "stickiness" can become a problem that more mechanical shear alone may not overcome. In addition, it is not always possible or desirable from the standpoint of energy consumption to increase the mechanical shear in a particle form evaporator.

The temperature of the bed can be controlled by controlling (1) the input of inert gas through the bed of polymer particles, (2) the power input to the agitator, or more preferably (3) the rate at which the polymer solution is added to the bed. Note that the greater the amount of polymer solution added to the bed the lower the temperature of the bed. Conversely, the temperature of the bed will tend to increase as less polymer solution is added. As discussed above, the bed should be maintained at a temperature sufficient to avoid an unacceptable degree of "stickiness." The appropriate temperature of the bed would depend upon such factors as, for example, the nature of polymer and the solvent as well as the presence or absence of additives. If an inert gas is employed, the temperature at which the bed is kept can be substantially the same as the temperature of the inert gas circulating therethrough. For a butadiene-styrene copolymer bed with $N_2$ as the inert gas, the bed is typically maintained at about 190°–275° F.

Substantially dry polymer particles are removed from the bed and optionally passed to a blower-grinder. The particles can be ground and a portion thereof recycled to the bed to facilitate drying. In this manner a fresh supply of fine, dry polymer particles is always available for the bed. The rate of discharge of polymer from the bed may be controlled by a discharge means such as, for example, a slide valve, which is automatically controlled by the motor load of the mechanical agitator. The greater the load on the motor, the more polymer discharged. The smaller the load on the motor, the less polymer discharged.

Particle form evaporation is most readily applicable to any polymer solution which can yield a flowable crumb in the particle form evaporator at a temperature from about 20°–50° F. (11°–28° C.) above the normal boiling point of the solvent.

Although the scope of our invention broadly encompasses polymers in general it is of particular importance to rubbery polymers since they, as a general rule, are best suited for the particle form evaporation process. Our invention, although not limited thereto, is of special importance with respect to those rubbery polymers such as, for example, the polybutadienes, which are so sticky and so fluid as to make the prior art particle form evaporation process an inefficient or even impracticable means of polymer drying or recovery.

Suitable parting agents which can be used in the drying process include, but are not limited to, those materials known in the art as processing aids, dispersing agents, mold lubricants, slip agents, antiblocking agents and the like. Examples of suitable types of parting agents include aliphatic or aryl carboxylic acids, fatty acid salts, silicone compounds, waxes and the like. Examples of numerous suitable parting agents are found in Blue Book 1981, at pages 167–173 and 257–270 (published by Bill Communication, Inc.).

Suitable aliphatic or aryl carboxylic acids include linear carboxylic acids having about 8 to about 30 carbon atoms or more such as, for example, octanoic, nonanoic, decanoic, undecanoic, dodecanoic, tridecanoic, tetradecanoic, pentadecanoic, hexadecanoic, heptadecanoic, octadecanoic, nonadecanoic, eicsanoic, heneicosanoic, docosanoic, tricosanoic, tetraosanoic, pentacosanoic, hexacosanoic, heptacosanoic, octacosanoic, nonacoisanoic, triacontanoic, hentricontanoic, dotriacontanoic, tetratriacontanoic, and sentatrioacontanoic acid. In addition, the carboxylic acids useful in the present invention may contain branched carbon chains or pendant carboxyl groups (e.g. iso-lauric or iso-stearic acid).

Fatty acid salts suitable for use in the present invention are typically high melting solids and include the Group I, II, III or IV metal salts of those fatty acids having from about 8 to about 30, more preferably from about 12 to about 18 carbon atoms per molecule. Examples of suitable fatty acid salts include, but are not limited to, the aluminum, calcium lead, magnesium, sodium and zinc salts of lauric, myristic, palmitic and stearic acids.

The silicone compounds suitable for use in the present invention include hydroxy end-blocked dihydrocarbyl silicone fluids and carboxyalkylsiloxanes. The hydroxy end-blocked dihydrocarbyl silicone fluids, also known as polydihydrocarbylsiloxanes are typically available as concentrated emulsions having 25 to 75 weight percent solids and have the following generic formula:

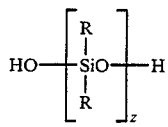

wherein z is an integer between about 30 and about 200. The hydrocarbyl substituents R are more fully defined below, but briefly, they can include alkyl, cycloalkyl and aryl groups as well as combinations thereof, with each hydrocarbyl substituent having up to about 12 carbon atoms. A presently preferred polydihydrocarbyl siloxane is polydimethylsiloxane due to its availability.

The carboxyalkylsiloxanes suitable for use in the present invention conform to the following generic formula:

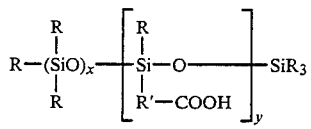

wherein each R is independently a monovalent hydrocarbyl radical containing between about one and about 18 carbon atoms, R is a divalent hydrocarbyl radical containing between 1 and about 18 carbon atoms, x is an integer between about 30 and about 100, and y is an integer between about 5 and about 20, with the proviso that the acid number of the siloxane be between about 50 and about 300.

Illustrative of R is any monovalent hydrocarbyl radical such as, for example, alkyl (such as methyl, ethyl, n-pentyl, n-dodecyl n-octadecyl, 2-ethyl-n-hexyl and the like); cycloalkyl (such as cyclobutyl, cyclopentyl, cyclohexyl, and the like); aryl (such as phenyl, naphthyl, biphenyl, and the like); alkenyl (such as vinyl, allyl, methallyl, 3-butenyl, and the like); alkaryl (such as tolyl, xylyl, 2,4-diethyl-phenyl, 4-dodecylphenyl, and the like); aralkyl (such as phenylethyl, and the like) and mixtures of any two or more thereof.

Illustrative of R' is any divalent hydrocarbyl radical such as, for example, alkylene (such as methylene, polymethylene, isopropylene, octadecylene, 2,2,4-trimethylpentylene, and the like); cycloalkylene groups (such as cyclopropylene, cyclobutylene, cyclooctylene, 1-methyl-2-ethylcyclohexylene, and the like); or an aralkylene group (such as diphenylmethylene, beta-phenylethylene, and the like) and mixtures of any two or more thereof.

Waxes suitable for use in the present invention vary in mean molecular weight from about 550 to about 1000. The waxes at the lower end of the molecular weight range are linear paraffins which occur naturally in crude oil and which have been separated therefrom. The waxes at the upper end of the molecular weight range are of the microcrystalline type.

Suitable fillers which can be utilized in the drying process include, but are not limited to, those fillers which are commonly added to rubbery polymers, especially the so-called solution rubbers. These fillers are added, for example, to enhance various properties of the product, to change color or simply to extend the polymer to give a lower cost product. Examples of suitable fillers include silica, sand, various forms of calcium carbonate (such as limestone, diatomaceous earth and chalk), clay, hydrated aluminum silicate, magnesium silicate, kaolin, feldspar, mica, aluminum hydroxide, ZnO, ZnS, $TiO_2$, $BaSO_4$, barytes, asbestos, cotton, jute, wood, nylon, wool and glass. The list can be expanded to include any of the carbon blacks and amorphous or crystalline graphite. Suitable fillers also include non-rubbery polymers such as any of the polymers which are compatible (i.e. mutually soluble) with the rubbery polymer. Suitable non-rubbery polymers include, by way of non-limiting example, the polystyrene polymers whether homopolymer, copolymer, terpolymer, etc. or blends thereof. A specific example that is well suited for this purpose is poly($\alpha$-methyl styrene). It is also possible to use a rubbery polymer as the filler when this rubbery polymer is harder or less sticky than the polymer in solution.

When the additive compound in the practice of the invention comprises at least one parting agent and at least one filler, the weight ratio of filler-parting agent combination which is suitable for use ranges from about 1:30 to about 30:1, preferably about 1:10 to about 10:1. Most preferably, for optimum results and most efficient use of reagents, the weight ratios of filler:parting agent will be maintained between about 1:3 and about 6:1.

The total amount of additive, such as for example filler-parting agent combination employed in the practice of our invention can vary widely. The minimum amount required is that amount which aids prevention of sticking of polymer particles to each other as well as to the purge column walls and rotor of the particle form evaporator. The upper limit which can be used is often dictated by practical considerations such as for example end-use requirements of the dried polymer, cost of the additive compared to the cost of the polymer being dried, compatibility of the additive with the polymer being dried and the like. Although not limited thereto, the following ranges are suggested to provide additional guidance to one skilled in the art seeking to practice our invention. Broadly, from about 0.01 to about 100 parts by weight of the additive per 100 parts by weight of polymer to be dried, preferably about 0.02 to about 80 parts by weight of the additive per 100 parts by weight of polymer to be dried will be employed. Most preferably, about 0.05 to about 60 parts by weight of the additive per 100 parts by weight of polymer to be dried will be employed since optimum results and most efficient use of reagents are expected in this range.

When the additive consists essentially of at least one parting agent, the additive can be added to the polymer solution before introduction of the polymer solution into the particle form evaporator. or introduced into the particle form evaporator at the same time as, but separate from, the polymer solution. It is of course possible to introduce a portion of the additive with the polymer solution, and then to introduce the remaining portion of the additive into the same bed.

When the additive comprises at least one filler and at least one parting agent, the components can be added to the polymer solution either individually or in combination before introduction of the polymer solution into the particle form evaporator; or introduced into the particle form evaporator at the same time but separate from the polymer solution. It is of course possible to introduce a portion of the additive comprising filler and parting agent, either individually or with the polymer solution and then to introduce the remaining portion of the filler and/or parting agent separately or in combination into the same bed.

In accordance with one method for practicing our invention the polymer solution and additive comprising at least one filler and at least one parting agent are combined to form a paste prior to introducing the polymer solution and additive comprising filler and parting agent into the bed of polymer particles in the particle form evaporator. To facilitate formation and processing of the paste, an oil such as one of the naphthenic, aromatic or paraffinic extender oils can be added to the mixture. Additional solvent may also be added if desired. By using a paste to introduce the polymer and additive comprising filler and parting agent into the bed, the concomitant introduction of air into the particle form evaporator is substantially eliminated.

An inert gas purge (for example $N_2$) can also be used to substantially eliminate air from the system. The inert gas can be used to purge air from the fillers, parting agents and other materials before they are added to the particle form evaporator.

The rate at which the additive, such as for example, additive comprising filler and parting agent, either individually or in combination, and the polymer solution are added to the polymer particulate bed can be controlled in response to a signal indicating the temperature of the bed or the rate at which polymer is removed from the bed or the rate of which polymer is removed from a stripping column positioned to receive polymer from the particle form evaporator. Some of the possible control systems are illustrated in FIGS. 1 and 2.

Figure 2:
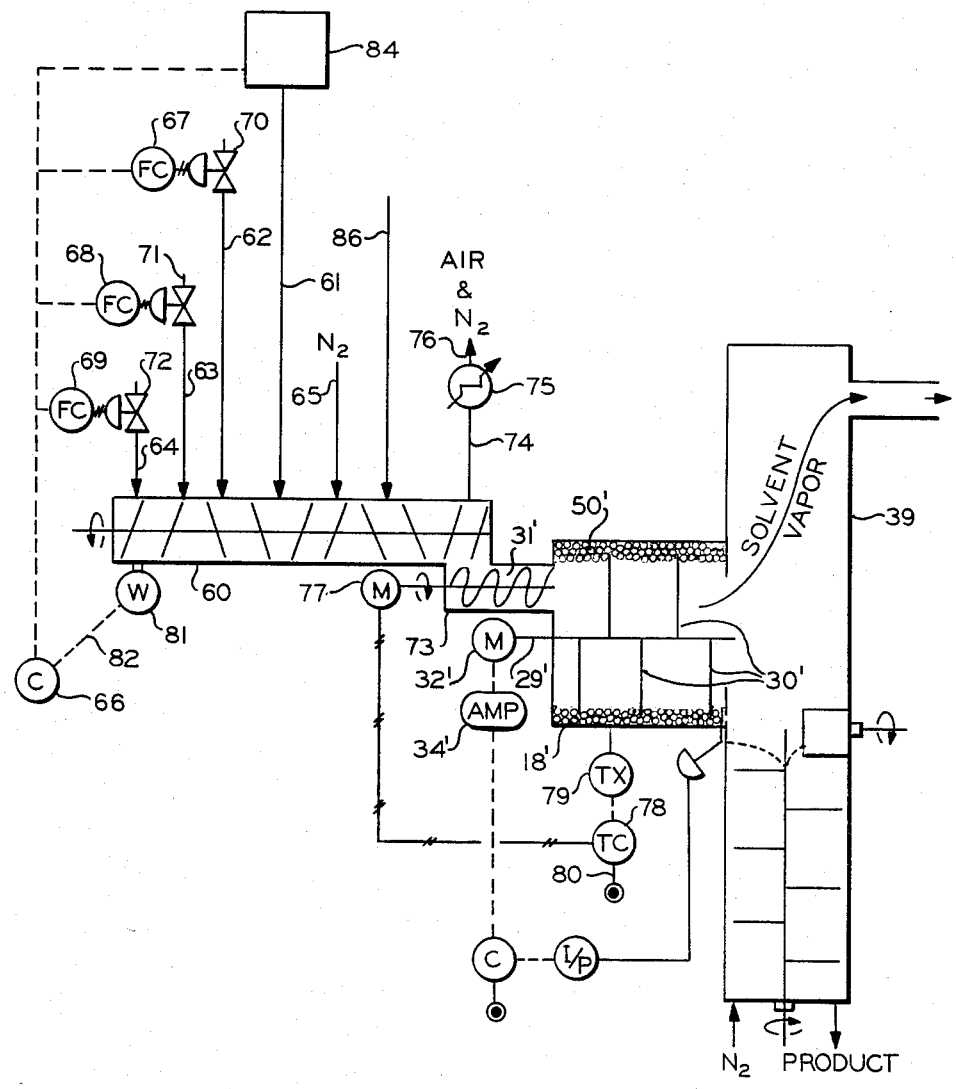
FIG. 2 depicts another embodiment of a particle form evaporation apparatus suitable for the practice of the process of the invention.

FIG. 1 depicts a particle form evaporation process incorporating one embodiment of our invention. Additive comprising parting agent or previously blended filler-parting agent combinations are passed from a weighing and control device 10 through lines 11, 12, 13 and 14 to a ribbon blender 15. It should be noted that each line handles only one additive composition and that the relative amount of each additive composition employed can be controlled by the device 10. The additive compositions are mixed in the ribbon blender 15 and passed to one of two loss in weight feeders 16 and 17. While one of the feeders dumps its load at a controlled rate into the particle form evaporator 18, the other feeder receives mixed additive compositions from the blender 15. Nitrogen is added near the bottom of each feeder to purge air from the additive compositions before they are mixed with the polymer solution in the particle form evaporator 18.

A feed rate controller 19 receives a signal 21 from a weighing unit 20 indicating the production rate of the dried product. The controller 19 also receives a signal 22 from the loss in weight feeder 16 or 17 presently feeding the particle form evaporator 18. This signal 22 indicates the weight of the additive compositions remaining in the feeder 16 or 17. The output from controller 19 is a signal 23 which regulates a valve on the loss in weight feeder 16 or 17 presently in operation. In this manner the desired quantity of the desired mixture of additive compositions is added to the particle form evaporator 18 in response to the production rate of dried product. As an alternative to this control scheme the amount of additive mixture added to the particle form evaporator can be slaved to the rate at which polymer solution is introduced into the particle form evaporator.

The polymer solution is fed through line 24 into the particle form evaporator 18. A control valve 25 regulates the amount of polymer solution fed in response to the temperature in the particle form evaporator 18 as measured by a thermocouple located therein and transmitted by transmitter 26 to temperature controller 28. The temperature controller 28 also receives a set point signal 27. In accordance with this arrangement the controller 28 can manipulate control valve 25 to maintain the desired temperature in the particle form evaporator 18.

The particle form evaporator 18 is a cylinder the axis of rotation of which is horizontally aligned (in other embodiments of this invention the particle form evaporator can be inclined or even vertically aligned). A rotating shaft 29 is fitted with an extruder feeder 31 and blades 30. The extruder feeder 31 forces the mixture into the particle form evaporator 18. The blades 30 violently mix and agitate the material in the particle form evaporator 18. The beating action of the blades forces the material 50 against the walls of the evaporator 18. The particle bed is comprised of material 50 and is maintained in close proximity to the cylinder walls by the continued beating action of the blades 30. The tip speed of the blades typically ranges from about 43 to about 146 feet per second.

A motor 32 drives the shaft 29. A controller 33 senses the load on the motor by means of amp meter 34 and then compares that reading with the set point 35. As a result of this comparison an output signal 36 is generated. The signal 36 is converted from an electrical signal to a pneumatic signal by transducer 37. Gate 38, in response to this pneumatic signal, controls the flow of polymer (and the additive compositions now incorporated therein) from the particle form evaporator 18 to a stripping column 39 for further removal of solvent. The load on the motor is a function of the amount of material in the particle form evaporator 18. If the load is greater than desired, the gate 38 is opened wider to reduce the particle bed depth and, correspondingly, the load on the motor. This system allows a maximum input of work from the motor to the bed.

The stripping column 39 channels solvent vapor from the particle form evaporator 18 and removes most of the last traces of solvent from the polymer by passing $N_2$ (or other inert gas) through the column. This latter objective is facilitated by a grinder 40 and agitator blades 41 attached to a shaft 42 rotated by a motor, not shown in the drawing. The grinder 40 grinds the polymer and throws it upwards to encourage evaporation of the solvent. Typically, the polymer passing through gate 38 to the stripping column 39 contains about 0.06 to 0.08 pounds of solvent per pound of polymer. The polymer removed from the stripping column 39 at 43 typically contains about 0.002 pounds of solvent per pound of polymer. These numbers are, of course, subject to wide variation.

In an alternate embodiment of our invention, dry fillers contained in weighing and control device 10 can be passed through line 11, 12, 13 and 14 and ultimately into particle form evaporator 18, as described above. Parting agent, in accordance with this embodiment of the invention, can be added to particle form evaporator 18 along with polymer solution via line 24 or alternatively may be added to particle form evaporator 18 directly via a line not shown. In this embodiment of the invention, the polymer solution is thus separately contacted with the additive components, i.e., filler and parting agent.

FIG. 2 depicts a particle form evaporation process in which another embodiment of our invention is illustrated. A paste is formed in a low speed extruder-mixer 60 by passing to the extruder-mixer the polymer solution and parting agent, and optionally fillers, N₂, oil and solvent. The parting agent(s) alone or additive comprising filler-parting agent combinations are mixed and blended in blender-feeder 84 as described with respect to FIG. 1 and then passed through line 61 to the extruder-mixer 60. Where fillers alone are blended in vessel 84, parting agent can be added directly to extruder 60 via separate line 86. Solvent is added to extruder-mixer 60 through line 62. Polymer solution is added to extruder-mixer 60 through line 63. Oil is added to extruder-mixer 60 through line 64. N₂ is added to extruder-mixer 60 through line 65.

The amount of fillers, parting agents, solvent, polymer solution and oil is controlled in response to signal 82 from weighing unit 81 to controller 66. Signal 82 is a measure of the weight of the extruder-mixer 60 and its contents. Flow controllers 67, 68 and 69 control, respectively, valves 70, 71 and 72 in response to the controller 66. A valve not shown in the drawing is similarly controlled by controller 66 to regulate the flow of fillers or filler-parting agent combinations from vessel 84 into the extruder-mixer 60. N₂ is added in an amount sufficient to purge air from the paste formed in extruder-mixer 60.

Oil and solvent are added as needed to facilitate formation of the paste which could otherwise be very difficult when large amounts of dry fillers and only small amounts of parting agent are used in the process. The extruder-mixer 60 drives the mixture from left to right towards an extruder 73. Near the end of the extruder-mixer 60, a means 74 is provided to allow N₂ and air to escape from the system. Some solvent vapor may accompany the escaping N₂ and air. The solvent vapor is condensed by condenser 75. The condensed solvent, now in liquid form, falls back through 74 to the extruder-mixer 60. Uncondensed air and N₂ are removed from the process through line 76.

The speed of motor 77 determines the transfer rate of the paste mixture from the extruder-mixture 60 to the particle form evaporator 18'. A temperature controller 78 sets the motor speed in response to the difference between the temperature in the particle form evaporator 18' (as sensed by a thermocouple and transmitted by transmitter 79) and the desired temperature as indicated by set point 80.

The particle form evaporator 18', the stripping column 39 and the remaining controls are all operated as described in FIG. 1.

We claim:

1. In a process for drying a polymer solution comprising polymer and solvent which comprises introducing the polymer solution into an agitated bed of polymer particles; wherein said agitated bed is mechanically agitated in a manner sufficient to cause evaporation of a substantial portion of said solvent, the improvement which comprises introducing an additive comprising at least one parting agent into said agitated bed; wherein said additive is introduced in an amount sufficient to reduce the buildup of polymers on the walls of said agitated bed; and wherein said parting agent is selected from the group consisting of:
    aliphatic carboxylic acids,
    aryl carboxylic acids,
    fatty acid salts,
    hydroxy end-blocked dihydrocarbyl silicone fluids,
    carboxyalkysiloxanes, and
    waxes.

2. A process as recited in claim 1 wherein said additive is introduced into said agitated bed in an amount ranging from about 0.01 to about 100 parts by weight per 100 parts by weight of polymer to be dried.

3. A process as recited in claim 1 wherein said polymer solution is sprayed into said bed and said additive is introduced into said bed separate from said polymer solution.

4. A process as recited in claim 1 wherein said polymer solution and said additive are combined and then introduced into said agitated bed in combination.

5. A process as recited in claim 1 wherein said agitated bed of polymer particles is maintained at a temperature above about the boiling point of said solvent.

6. A process as recited in claim 1 wherein polymer particles are removed from said agitated bed and introduced into a stripper column; wherein said stripper comprises a column and a second bed of agitated polymer particles.

7. A process as recited in claim 4 wherein the rate at which said combination is added to said bed is controlled in response to a signal indicating the temperature of said bed.

8. A process as recited in claim 6 wherein the rate at which said additive is introduced into said agitated bed is controlled in response to a signal indicating the rate at which polymer is removed from said stripper column.

9. A process as recited in claim 5 wherein an inert gas is passed into said agitated bed to facilitate evaporation of said solvent.

10. A process as recited in claim 1 wherein said additive further comprises at least one filler.

11. A process as recited in claim 10 wherein said polymer solution and said additive are combined to form a paste; and wherein said paste is introduced into said agitated bed.

12. A process as recited in claim 10 wherein said at least one filler is at least one member selected from the group consisting of
    silica,
    sand,
    calcium carbonate,
    clay,
    hydrated aluminum silicate,
    magnesium silicate,
    kaolin,
    feldspar,
    mica,
    aluminum hydroxide,
    ZnO,
    ZnS,
    TiO₂,
    BaSO₄,
    barytes,
    asbestos,
    cotton,
    jute,
    wood,
    nylon,
    wool, glass,
carbon black,
amorphous graphite,
crystalline graphite,
and mixtures of any two or more thereof.

13. A process as recited in claim 10 wherein said at least one filler is a non-rubbery polymeric filler.

14. A process as recited in claim 10 wherein said polymer, said polymer particles and said at least one filler are rubbery polymers; and wherein said at least one filler rubbery polymer is harder or less sticky than said rubbery polymer in solution.

15. A process as recited in claim 1 wherein said aliphatic carboxylic acids are selected from the group consisting of
octanoic acid,
nonanoic acid,
decanoic acid,
undecanoic acid,
dodecanoic acid,
tridecanoic acid,
tetradecanoic acid,
pentadecanoic acid,
hexadecanoic acid,
heptadecanoic acid,
octadecanoic acid,
nonadecanoic acid,
eicosanoic acid,
heneicosanoic acid,
docosanoic acid,
trisanoic acid,
tetracosanoic acid,
octacosanoic acid,
nonocosanoic acid,
triacontanoic acid,
hentricontanoic acid,
dotriacontanoic acid,
tetratriacontanoic acid,
sentatrioacontanoic acid,
isolauric acid,
isostearic acid, and
mixtures of any two or more thereof.

16. A process as recited in claim 1 wherein said fatty acid salts are selected from the group consisting of Group I, II, III or IV metals salts of fatty acids having from about 8 to about 30 carbon atoms.

17. A process as recited in claim 1 wherein said hydroxy end-blocked dihydrocarbyl silicone fluids are selected from the group consisting of

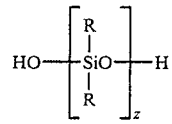

wherein Z is an integer between about 30 and about 200, and each R is independently an alkyl, alkenyl, aryl, alkaryl or aralkyl radical having up to about 12 carbon atoms.

18. A process as recited in claim 1 wherein carboxyalkylsiloxanes are selected from the group consisting of

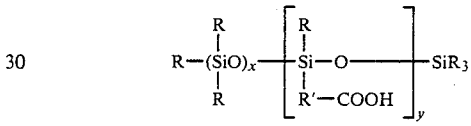

wherein x is an integer about 30 and about 100, y is an integer between about 5 and about 20, each R is independently an alkyl, alkenyl, aryl, alkaryl or aralkyl radical having up to about 18 carbon atoms and R' is an alkylene or aralkylene radical having up to about 18 carbon atoms.

* * * * *

UNITED STATES PATENT AND TRADEMARK OFFICE
CERTIFICATE OF CORRECTION

PATENT NO. : 4,532,272

DATED : July 30, 1985

INVENTOR(S) : Mason S. Wilt and Richard E. Dietz

It is certified that error appears in the above—identified patent and that said Letters Patent is hereby corrected as shown below:

Claim 6, line 3, after "stripper" insert ---column---. (2nd occurr.)

Claim 17, line 7, delete "Z" and insert lower case "z".

Claim 18, line 7, after "integer" and before "about", insert ---between---.

Signed and Sealed this

Third Day of June 1986

[SEAL]

Attest:

DONALD J. QUIGG

Attesting Officer

Commissioner of Patents and Trademarks